United States Patent [19]

Yoshikawa et al.

[11] Patent Number: 4,872,932

[45] Date of Patent: Oct. 10, 1989

[54] METHOD FOR MAKING RUBBERY COMPOSITE MATERIALS BY PLATING A METAL SUBSTRATE WITH A COBALT ALLOY

[75] Inventors: Masato Yoshikawa, Tokyo; Yukio Fukuura, Kawagoe; Setsuo Akiyama, Kodaira; Makoto Nakamura, Fujimi; Kazuo Naito, Kawasaki; Toshio Honda, Akigawa, all of Japan

[73] Assignee: Bridgestone Corporation, Tokyo, Japan

[21] Appl. No.: 182,083

[22] Filed: Apr. 15, 1988

Related U.S. Application Data

[63] Continuation-in-part of Ser. No. 919,012, Oct. 15, 1986, abandoned.

[30] Foreign Application Priority Data

| Oct. 15, 1985 | [JP] | Japan | 60-229638 |
| Oct. 15, 1985 | [JP] | Japan | 60-229639 |
| Oct. 15, 1985 | [JP] | Japan | 60-229640 |

[51] Int. Cl.$^4$ .............................................. C25D 5/24
[52] U.S. Cl. ................................. 156/151; 156/307.7; 156/910; 152/565; 428/465; 428/679
[58] Field of Search ............ 156/910, 124, 151, 307.7; 428/462, 465, 469, 625, 679; 152/451, 565

[56] References Cited

U.S. PATENT DOCUMENTS

| 2,240,805 | 5/1941 | Semon | 428/466 |
| 2,640,523 | 6/1953 | Palmer | 152/451 |
| 4,218,517 | 8/1980 | Van Ooij | 428/614 |
| 4,255,496 | 3/1981 | Haemers | 428/667 |
| 4,517,066 | 5/1985 | Benko | 204/192 C |

*Primary Examiner*—Michael W. Ball
*Assistant Examiner*—Michele K. Yoder
*Attorney, Agent, or Firm*—Birch, Stewart, Kolasch & Birch

[57] ABSTRACT

A rubbery composite material comprising a substrate and a rubber composition bonded thereto is prepared by metallizing a substrate with a thin film of zinc, copper, cobalt or an alloy thereof by dry plating such as vacuum deposition, iron plating, DC magnetron sputtering, bipolar sputtering, and RF sputtering processes, and pressing a vulcanizable rubber composition to the metallized substrate under heat and pressure to effect vulcanization bonding.

8 Claims, No Drawings

METHOD FOR MAKING RUBBERY COMPOSITE MATERIALS BY PLATING A METAL SUBSTRATE WITH A COBALT ALLOY

This invention is a continuation-in-part of the co-pending application Ser. No. 919,012 filed on Oct. 15, 1986, and now abandoned.

BACKGROUND OF THE INVENTION

The present invention relates to a method for preparing rubbery composite materials whereby a substrate such as metals, plastics, and ceramics and a rubber composition are bonded with excellent adherence onto a composite body.

Composite materials have been of great interest in a variety of industrial fields because of their superiority in function, reliability, and durability and in cost to the respective components per se. There have been developed a number of new composite materials based on a specific combination of various components.

Composite materials are generally classified into blend and laminate types depending on their composite form. Among these types a more active development work has been focused on the laminate type composite materials because they can be conferred with unique properties as exemplified by anisotropy. Inter alia, rubbery composite materials constitute one class of material where the development work is most active as they can be utilized in a wider variety of fields including not only automobile parts such as tires, vibration dampers, and bumpers, but also electric and electronic parts, and sports items.

Production of a laminate type composite material depends on whether or not a substrate such as fibers, metals, etc. and a rubber compound can be fully bonded. Particularly when the lamination is of a rubber composition, a high level of technology is required because of the special factor that rubber matrix repeats great dynamic deformation. An improvement in bonding techniques is one of main concerns of laminate type composite materials, inter alia, rubbery composite materials.

In the prior art, laminate type composite materials, inter alia, rubber composite materials are produced, for example, by an indirect bond method wherein an adhesive is applied to at least one of a substrate and a coating of rubber composition to bond them together with or without forming a finely roughened surface on at least one of them. Another bonding method is by forming a metal thin film of zinc or brass on a substrate by wet plating and bonding a vulcanizable rubber composition to the metal thin film under heat and pressure.

The former method, that is, adhesive bonding between a substrate and a coating with or without a roughened surface on the substrate has been commercially practiced in the manufacture of vibration damping rubbers or the like. However, there remain many problems including coating considerations such as adherent pretreatment and adhesive maintenance, complicated operation, and safety and hygienic problems associated with the use of organic solvent and the post-disposal of a pretreating agent. Problems also arise when the substrate is of, a plastic material. Not only is the adhesive which can bond a plastic material into a composite material limited to a special class of adhesives, but also the bondable substrate is limited to fewer types of plastic materials such as nylon and ABS resins. This indirect bonding method cannot be essentially used in the manufacture of tires and similar articles which are exposed to an extremely severe environment during service. There is the need for an adhesive-free bonding technique in the industrial fields of tire manufacturers and the like.

The latter method, that is, composite material production utilizing a wet-plated metal thin film is only successful with a few metals used as a metal thin film for composite bonding, usually zinc, brass (Zn—Cu alloy), and bronze (Sn—Cu alloy). The rubber composition which can be laminated on the metal thin film is accordingly limited to a few types. In utilizing the wet plating method, control of the thickness of a metal thin film is inherently difficult. The film tends to be irregular in thickness as often observed in electrolytic plating. A metal thin film having a uniform thickness cannot be obtained unless the thickness exceeds several microns. The intrinsic nature of a metal thin film having such a substantial thickness cannot be ignored depending on the intended type of composite material and sometimes detracts from the flexibility of the resulting composite material. Disposal of spent solutions with a strong acid or alkali is also a problem.

More specifically, the prior art method for adhesion of a metal surface and an unvulcanized rubber are as follows:

(i) a method comprising applying an adhesive containing a chlorinated polymer, cyclized rubber or the like to a cleaned metal surface to bond it to a rubber;

(ii) a method comprising laminating a rubber composition containing resorcin, hexamethylenetetramine or the like on a metal such as brass, bronze, zinc or the like, and vulcanizing the rubber composition, thereby bonding the metal to the rubber composition; and (iii) a method comprising laminating a rubber composition containing an organic cobalt salt such as cobalt naphthenate, cobalt stearate or the like on a metal such as brass, bronze, zinc or the like and vulcanizing the rubber composition, thereby bonding the metal to the rubber composition.

Method (i), which is referred to an "indirect process", is mainly employed on the production of rubber vibration insulator. On the other hand, methods (ii) and (iii), which are referred to as a "dry process" or "direct process", are employed in a more severe use condition including the production of tire, conveyer belt, hose, etc. Method (ii), however, has a problem, in that, although it provides good adhesion of the rubber composition and metal in an initial stage, the adhesion property would deteriorate after a long period of usage especially under a severe condition, such as high temperature, high moisture and corrosion circumstances. Further, method (ii) is inferior in workability and productivity. Therefore, method (iii), which uses an organic cobalt salt, usually in an amount of 1 to 3 parts by weight per 100 parts by weight of a rubber component, is widely employed in the field of rubber articles, tires, etc. because the addition of the organic cobalt salt to a rubber composition would accelerate the adhesion reaction between the rubber composition and metal (brass, bronze and zinc), improve corrosion resistance and heat resistance of the adhesion interface, and stabilize the adhesion strength for a long period of time. See W. J. van Ooij, ACS Rubber Division 112th Meeting, No. 19, October 1977, Pages 18 to 19; W. J. van Ooij et al, ACS Rubber Division 124th Meeting, October 1983, Rubber Chemistry and Technology, 57, 686–702.

As described above, when bonding a metal (typically brass, bronze and zinc) to a rubber composition, it is a common practice in the field to blend an organic cobalt salt to the rubber composition. Such a rubber composition containing an organic cobalt salt is vulcanized by using sulfur. In this case, it is recognized that the sulfur content should be larger, usually more than 6 parts by weight per 100 parts by weight of a rubber component (W. J. van Ooij et al, ACS Rubber Division 118th Meeting, No. 36, October 1980, Page 15). However, the addition of an organic cobalt salt will accelerate heat aging of rubber and deteriorate the rubber property. Further, as the sulfur content becomes larger, the heat aging property of rubber becomes worser.

Benko, U.S. Pat. No. 4,517,066, Haemers, U.S. Pat. No. 4,255,496, Palmer, U.S. Pat. No. 2,640,523 and Van Ooij, U.S. Pat. No. 4,218,517 are disclosed bonding methods of a rubber composition and a substrate.

SUMMARY OF THE INVENTION

An object of the present invention is to provide a method for preparing a rubbery composite material having improved adherence by bonding a rubber composition to any desired substrate including metals, plastics, ceramics, and glass without resorting to an adhesive or wet plating.

Another object of the present invention is to provide a method for preparing a rubbery composite material by bonding a rubber composition containing no organic cobalt salt and only a small amount of sulfur to a substrate which is covered with a cobalt or cobalt alloy layer with an excellent adhesion strength.

We have discovered that a metal such as zinc, copper, cobalt, and an alloy thereof can be integrated into a rubber composition to form a rubbery composite material exhibiting a firm bond between the components by press bonding the metal at a temperature which approximate to the temperature at which the rubber composition is usually heated for vulcanization; that these metals can be readily deposited on a substrate as a thin film by a dry plating process such as vacuum deposition, ion plating, DC and RF magnetron sputtering, bipolar sputtering, and RF sputtering processes; and that a rubber composition can firmly bond to the resulting metal thin film.

Particularly, when a cobalt or cobalt alloy thin film is formed on a substrate by a dry plating process selected from the group consisting of vacuum deposition, ion plating, DC and RF magnetron sputtering, bipolar sputtering, and RF sputtering processes at a thickness 10 Å to 1 μm, a rubber composition can be directly bonded to the substrate having a cobalt or cobalt alloy with an excellent adhesion strength even if the rubber composition does not contain any organic cobalt salts and only contains a small amount of sulfur, i.e. less than 4 parts by weight, especially less than 3 parts by weight, more especially less than 2.5 parts by weight of sulfur to 100 parts by weight of a rubber component.

According to the present invention, there is provided a method for preparing a rubbery composite material comprising a substrate such as a metal, plastic or ceramic substrate and a rubber composition bonded thereto, comprising the steps of:

depositing a metal thin film selected from the group consisting of zinc, copper, cobalt, and alloys thereof on the surface of a substrate by a dry plating process selected from vacuum deposition, ion plating, magnetron sputtering, bipolar sputtering, and RF sputtering processes, and holding a vulcanizable rubber composition in intimate contact with the metal thin film under heat and pressure to obtain vulcanization bonding.

More specifically, the present invention provides a method for making a rubbery composite material comprising a metal substrate and a rubber composition bonded thereto, comprising the steps of:

depositing a cobalt or cobalt alloy thin film on the surface of a metal substrate by a dry plating process selected from the group consisting of vacuum deposition, ion plating, DC and RF magnetron sputtering, bipolar sputtering, and RF sputtering processes, and holding a rubber composition in intimate contact with said cobalt or cobalt alloy thin film under heat and pressure to achieve vulcanization bonding, said rubber composition being free of an organic cobalt salt.

The present invention also provides a method for making a rubbery composite material comprising a plastic substrate and a rubber composition bonded thereto, comprising the steps of:

depositing a metal thin film selected from the group consisting of zinc, copper, cobalt, and alloys thereof on the surface of a plastic substrate by a dry plating process selected from the group consisting of vacuum deposition, ion plating, DC and RF magnetron sputtering, bipolar sputtering, and RF sputtering processes, and holding a rubber composition in intimate contact with said metal thin film under heat and pressure to achieve vulcanization bonding.

According to the present invention, a rubber composition can be bonded to any substrates made up from a wider variety of materials than available in the prior art techniques, including metal materials such as steel and aluminum, plastics materials such as polyallylate, polyacrylate, and polyamide, and inorganic materials such as ceramics and glass without resorting to an adhesive or wet plating. The problems associated with the use of adhesive and wet plating are thus eliminated. The resulting rubbery composite material exhibits a firm bond between the components. The present method allows for bonding into a composite structure of materials of the type, shape, and size which are otherwise difficult to bond to a rubber composition in the prior art.

Particularly, in the present invention, a metal substrate having a cobalt or cobalt alloy thin film deposited thereon by the specific dry plating process can be bonded to a rubber composition containing no organic cobalt salt and sulfur, only in a small amount of less than 4 parts by weight, preferably less than 3 parts by weight, more preferably less than 2.5 parts by weight with an excellent adhesion strength. Further, since the rubber composition does not contain any organic cobalt salt and it is possible to decrease the sulfur content in the rubber composition, the rubber property after heat aging is retained in an allowable range. Therefore, both an excellent adhesion property between the metal substrate and the vulcanized rubber and an improved heat aging property of the rubber can be accomplished at the same time according to the present invention.

The rubbery composite materials produced by the present method will find wide applications as in steel tires, conveyor belts, hoses, and vibration dampers, for example, in the case of metal-rubber composite materials. Plastic-rubber composite materials are advantageously utilized as vibration dampers, toys, and household goods. Ceramic or glass-rubber composite materials are similarly utilized as industrial tools and parts, household goods, and toys. Especially, the present invention is utilized for bonding a rubber composition and a metal substrate such as steel wire, steel cord, steel tire cord, steel cable, steel strand, steel rod, steel plate, steel filament and other steel substrates, and those having a various metal thin layer such as zinc, brass and bronze thereon.

The above and other objects, features, and advantages of the present invention will be more apparent from the following description.

DETAILED DESCRIPTION OF THE INVENTION

The rubbery composite material preparing method of the present invention is predicated on the bonding of a rubber composition to a substrate into a composite structure. The substrates which can be used in the practice of the present invention are not particularly limited with respect to their material type, shape, and size. Examples of the materials of which the substrates are made up include metals such as steel, stainless steel, aluminum, copper, and copper alloys; thermoplastic resins, for example, polyesters such as polyallylate, polyethylene terephthalate, polybutylene terephthalate, and polyoxybenzoyl, polyamides such as 6-nylon, 6,6-nylon, and aromatic polyamides, polyethers such as polyacetal, polyphenylene oxide, polyether ether ketone, and polyphenylene sulfide, polysulfones such as polysulfone and polyether sulfone, polyimides such as polyimide, polyether-imide, polyamide-imide, and polybismaleimide, and polycarbonates; thermosetting resins, for example, formaldehyde resins such as phenol resins and melamine resins, allyl resins such as diallyl phthalate, epoxy resins, silicone resins, and polyurethane resins; and polymer blends of an unsaturated polyester resin and a vinyl ester resin as frequently used in fiber-reinforced plastics; ceramics and glass. The particular material, shape, and size of the substrate used may be properly selected depending on the intended application.

According to the present method, a metal-thin film selected from the group consisting of zinc, copper, cobalt, and alloys thereof is first deposited on the surface of a substrate by a dry plating process selected from vacuum deposition, ion plating, DC and RF magnetron sputtering, bipolar sputtering, and RF sputtering processes before a rubber composition is composite bonded to the substrate. The formation of a metal thin film by the dry plating process may be carried out by a well-known method and by adequately choosing a dry plating apparatus having an appropriate chamber volume and a fastening jig to accommodate the shape and size of the substrate to be treated, and determining adequate operating parameters of the plating apparatus so as to match with the type of the substrate, the desired film thickness and physical properties. These parameters include an appropriate vacuum to be set, introduction of a gas such as argon and oxygen, substrate temperature, annealing conditions, and a choice of appropriate heating means for an evaporation source such as resistance heating, induction heating, and electron beam heating. An alloy thin film may be deposited by a dry plating process, for example, by disposing a plurality of evaporation sources which can be independently heated in the dry plating apparatus and controlling the heating conditions of the respective evaporation sources so as to meet a particular alloy composition to thereby codeposit the elements. The dry plating apparatus may be modified in any desired ways to form a metal thin film, for example, by adding to it an optical instrumentation system comprising a spectral filter and a monitoring glass for the purpose of optical control of film thickness by the $\lambda/4$ control method, or an automatic control system. These modifications are rather desirable for the object of the present invention because the film thickness can be more readily controlled during deposition so that a film of more stabilized quality is obtained. The dry plating processes used herein are vacuum deposition, ion plating, DC or RF magnetron sputtering, bipolar sputtering, and RF sputtering processes.

The metal thin films produced by the aforementioned process should be made up of a metal material selected from zinc, copper, cobalt, and an alloy thereof, preferably zinc, copper, brass, bronze, cobalt and cobalt alloys.

Among these materials the preferred metal is cobalt and cobalt alloys. The cobalt alloys include Co—Ni, Co—P, Co—Cr, Co—Al, Co—Sn and Co—Zn. The cobalt content in the cobalt alloy should preferably be more than 50% by weight, preferably more than 70% by weight, most preferably more than 80% by weight.

The thickness of the metal thin films produced by the present process is not particularly limited although the thickness range of from about 10 Å to about 100$\mu$ is preferred because of productivity. Thickness of about 10 Å to about 100 $\mu$m are most preferred because such a thin film has little influence on the properties of the final composite product.

The next step of the rubbery composite material preparing method according to the present invention is to bond a rubber composition to the metal thin film under heat and pressure by vulcanization. The rubbery composite material is produced by utilizing the bonding force available between the metal thin film and the vulcanizable rubber composition.

The rubber compositions which can be used in the practice of the present invention contain a rubber component selected from a natural rubber (NR) and a synthetic rubber having a carbon-to-carbon double bond in its structural formula, alone or in admixture of any two or more members. Some illustrative, non-limiting examples of the synthetic rubbers include homopolymers of conjugated diene compounds (e.g., isoprene, butadiene, and chloroprene), for example, polyisoprene rubber (IR), polybutadiene rubber (BR), and polychloroprene rubber; copolymers of the aforementioned conjugated diene compounds with vinyl compounds (e.g., styrene, acrylonitrile, vinylpyridine, acrylic acid, methacrylic acid, alkyl acrylates, and alkyl methacrylates), for example, styrene-butadiene copolymer rubber (SBR), vinylpyridine-butadiene-styrene copolymer rubber, acrylonitrile-butadiene copolymer rubber, acrylic acid-butadiene copolymer rubber, methacrylic acid-butadiene copolymer rubber, methyl acrylate-butadiene copolymer rubber, and methyl methacrylate-butadiene copolymer rubber; copolymers of olefins (e.g., ethylene, propylene, and isobutylene) with diene compounds, for example, isobutylene-isoprene copolymer rubber (IIR); copolymers of olefins with unconjugated diene compounds (EPDM), for example, ethylene-propylene-cyclopentadiene terpolymer, ethylene-propylene-5-ethylidene-2-norbornene terpolymer, and ethylene-propylene-1,4-hexadiene terpolymer; polyalkenamers resulting from ring-opening polymerization of cycloolefins, for example, polypentenamer; rubbers resulting from ring-opening polymerization of oxirane ring, for example, sulfur-vulcanizable polyepichlorohydrin rubber; poly(propylene oxide) rubber, and the like. Also included are halogenated derivatives of the foregoing rubbers, for example, chlorinated isobutylene-isoprene copolymer rubber (Cl-IIR) and brominated isobutylene-isoprene copolymer rubber (Br-IIR). Ring-opened polymers of norbornene are also employable. The rubber blends used herein are blends of any of the foregoing rubbers with a saturated elastomer such as epichlorohydrin rubber, poly(propylene oxide) rubber, and chlorosulfonated polyethylene.

The rubber compositions used herein may further contain fillers such as carbon black, silica, calcium carbonate, calcium sulfate, clay, diatomaceous earth, and mica usually in an amount of 0 to 200 parts by weight per 100 parts by weight of the rubber component; softeners such as mineral oils, vegetable oils, and synthetic plasticizers; vulcanization aids such as stearic acid; antioxidants; and an effective amount of crosslinking agents in a conventional manner and amount depending on the particular purpose or application of the rubbery composite products.

An organic cobalt salt such as cobalt naphthenate may be added to the rubber composition, usually in an amount of 1 to 2 parts by weight per 100 parts by weight of the rubber composition, to improve the adherence of the composition during bonding. However, it is preferred to use an organic cobalt salt-free rubber composition when a rubbery composite material is prepared from a substrate having a cobalt thin film deposited by dry plating. More specifically, it is known that rubber compositions having an organic cobalt salt added thereto are more effective in stabilizing their bond to substrates of brass and zinc as compared with the organic cobalt salt-free rubber compositions. Undesirably, as the amount of organic cobalt salt added increases, the rubber compositions having organic cobalt salt added thereto tend to deteriorate their bonding force with a lapse of time and substantially lose the rupture strength and elongation of rubber due to heat aging. Thus there is the need for a method for making a rubbery composite material by joining a rubber composition to a substrate without using an organic cobalt salt or by adding only a limited amount, usually 1 part by weight per 100 parts by weight of the rubber composition, of an organic cobalt salt. A system containing a resorcin formalin condensate, hexamethyltetramine, and silica in rubber is one exemplary composition satisfying such requirement, but is said as lacking stability and reliability in heat resistance, humidity resistance, and bonding force. The present method enables to produce a rubbery composite material having excellent adherence using a rubber composition free of the above-mentioned organic cobalt salt or resorcin formalin condensate when a cobalt thin film is deposited on a substrate by dry plating.

The bond of the rubber composition and the metal thin film is accomplished by forcing the rubber composition against the metal thin film under heat and pressure and effecting vulcanization under this heat press condition. The vulcanization technique used herein may be not only commonly used and most important sulfur vulcanization, but also vulcanization with an organic sulfur compound such as dithiodimorpholine and thiuram, although sulfur vulcanization is more preferred. In this case, sulfur content should preferably 0.5 to 4 parts by weight, more preferably 0.5 to 3 parts, particularly 0.5 to 2.5 parts by weight to 100 parts by weight of the rubber component with respect to heat aging resistance. According to the present invention, an excellent adhesion strength can be attained even if the sulfur content is 4 parts by weight or less. Therefore, the rubber has excellent physical properties including tensile strength, breaking strength and elongation. Moreover, the rubber is prevented from heat aging after vulcanization because so little sulfur is not used in the present invention.

The heating and pressure holding which are employed in the rubbery composite material making method of the present invention are carried out at such a temperature and pressure as to bring no change to the original shape of the substrate and rubber composition for the purposes of placing the rubber composition in close contact with the metallized substrate, supplying a sufficient activating thermal energy to induce a bonding force between the metal (zinc, copper, cobalt or alloy) and the vulcanizable rubber composition, and supplying a sufficient activating thermal energy to vulcanize the rubber composition. The optimum temperature and pressure for these purposes may be properly determined depending on the type of the substrate and rubber composition.

EXAMPLES

Examples will be presented below to further illustrate the present invention together with comparative examples. They are not to be construed as limiting the present invention. In Tables, Example, Comparative Example, and Reference Example are abbreviated as E, CE, and RE, respectively.

In the Examples, vacuum deposition, DC magnetron sputtering and ion plating were conducted as follows.

(A) Vacuum deposition

A specimen (substrate) was placed in a vacuum deposition apparatus. The vacuum chamber was evacuated to a vacuum of lower than $10^{-5}$ Torr and then supplied with a minor volume of argon gas to adjust the vacuum to $5 \times 10^{-3}$ Torr. Using an RF power supply, the substrate surface was cleaned for 5 minutes with an RF glow discharge. The RF glow discharge was interrupted at the end of cleaning. A metal source was heated by resistance heating to deposit a metal thin film on the substrate surface.

(B) DC magnetron sputtering

A specimen (substrate) was placed on a holder in a magnetron sputtering apparatus. The vacuum chamber was evacuated to a vacuum of lower than $10^{-5}$ Torr and then supplied with a minor volume of argon gas to adjust the vacuum to 0.1 Torr. Using an RF power supply at 13.56 MHz, the substrate surface was cleaned for 5 minutes with an RF glow discharge. The RF glow discharge was interrupted at the end of cleaning. Sputtering was carried out in an argon plasma by applying a DC voltage (target voltage) of $-600$ volts across a metal target at a target current of 0.5 amperes, thereby forming a metal thin film on the specimen surface.

(C) Ion plating

A specimen (substrate) was placed in an ion plating apparatus where an argon plasma was created by a conventional procedure using an RF power supply. With the argon plasma maintained, a metal source was evaporated by resistance heating to form a metal thin film on the specimen surface.

The measurement of film thickness was carried out using a Talistep meter (Taylor Hobson Company).

EXAMPLE 1

The substrates used were steel pieces (type SS-41), aluminum pieces or brass pieces of 25 mm wide by 60 mm long by 2.3 mm thick. The surfaces thereof were cleaned, dried, and then placed in a dry plating apparatus to form a cobalt thin film thereon by the above dry plating processes (A) to (C).

Against the cobalt thin film formed on the substrate surface by the dry plating was applied a vulcanizable rubber composition which had the formulation reported in Table 1. The assembly was compressed at 145° C. for 40 minutes to effect vulcanization, thereby firmly bonding the rubber composition to the substrate.

TABLE 1

| Rubber Composition | |
|---|---|
| Ingredients | Parts by weight |
| Natural rubber | 75 |
| Polyisoprene | 25 |
| Carbon black | 60 |
| Zinc oxide | 7.5 |
| Anti-oxidant[1] | 2 |
| Vulcanization promotor[2] | 1 |
| Sulfur | 4 |
| Vegetable or mineral oil | 2 |

[1]Anti-oxidant: N—phenyl-N'—isopropyl-p-phenylenediamine (Ohuchi Shinko Co., Ltd. Japan)
[2]Vulcanization promotor: N—oxydiethylene-2-benzothiazole sulfamide (Ohuchi Shinko Co., Ltd., Japan)

The rubbery composite materials obtained after vulcanization bonding of the rubber composition to the substrate were evaluated for adherence by a 90° peeling test using a tensile tester at a pulling speed of 50 mm/min.

For comparison purposes, a rubbery composite material was prepared from a substrate cleaned and dried as above vulcanization bonding the same rubber composition to it in the same manner as above, but directly without forming a cobalt thin film on the substrate. It was evaluated for adherence by the same test as above. The results of the adherence evaluation test are shown in Table 2.

TABLE 2

| Substrate material | Thin film forming process | Co thin film thickness | Rubber composition I substrate composite Bond strength (kg/inch) | Adherence performance* |
|---|---|---|---|---|
| [Examples] | | | | |
| Carbon steel (SS-41) | Vacuum deposition | 40 Å | 40 | R-100 |
| | | 2220 Å | 38 | R-100 |
| | DC Magnetron | 120 Å | 40 | R-100 |
| | | 4300 Å | 41 | R-100 |
| | Ion plating | 100 Å | 40 | R-100 |
| | | 560 Å | 40 | R-100 |
| Aluminum | Vacuum deposition | 40 Å | 41 | R-100 |
| | | 2220 Å | 42 | R-100 |
| | DC Magnetron | 120 Å | 40 | R-100 |
| | | 4300 Å | 40 | R-100 |
| | Ion plating | 100 Å | 38 | R-100 |
| | | 560 Å | 40 | R-100 |
| Brass | Vacuum deposition | 40 Å | 42 | R-100 |
| | | 2220 Å | 40 | R-100 |
| | DC Magnetron | 120 Å | 40 | R-100 |
| | | 4300 Å | 39 | R-100 |
| | Ion plating | 100 Å | 40 | R-100 |
| | | 560 Å | 42 | R-100 |
| [Controls] | | | | |
| Steel | — | — | 0 | M/R-100 |
| Aluminum | — | — | 0 | M/R-100 |
| Brass | — | — | 0 | M/R-100 |

*R designates rubber breakage, M/R designates interfacial separation between metal/rubber, and figures represent percentages of breakage or separation.

As seen from the data of Table 2, the rubbery composite materials prepared by directly vulcanizing the rubber composition to metal substrates exhibit poor adherence. On the contrary, the rubbery composite materials prepared by the present method, that is, by forming a cobalt thin film on metal substrates and vulcanizing the rubber composition to the metallized substrates exhibit excellent adherence to any of the steel, aluminum, and brass substrates. It is also illustrated that the method of the present invention allows rubbery composite materials having excellent adherence to be produced using the cobalt thin films which are formed by any of the dry plating processes to widely varying thickness without blending any organic cobalt salts to a rubber composition.

EXAMPLE 2

The procedure of Example 1 was repeated except that the metal substrate used was replaced by pieces of 25 mm wide by 60 mm long by 2 mm thick which were cut from polyallylate (trade name U-Polymer, Unichika Co., Ltd.), polyamide (6,6-nylon), polyether (trade name Noryl, Engineering Plastics Co., Ltd.), polysulfone (trade name PES, Nissan Chemical Co., Ltd.), and polycarbonate, and degreased on the surface with suitable solvent. They were evaluated for adherence.

The results of the adherence test are shown in Table 3 along with the thickness of the cobalt thin films formed during the preparation of composite material.

TABLE 3

| Substrate material | Thin film forming process | Co thin film thickness | Rubber composition I substrate composite Bond strength (kg/inch) | Adherence performance |
|---|---|---|---|---|
| Polyallylate (U-Polymer) | Vacuum deposition | 45 Å | 108 | R-100 |
| | | 2350 Å | 110 | R-100 |
| | DC Magnetron | 100 Å | 107 | R-100 |
| | | 4300 Å | 105 | R-100 |
| | Ion plating | 90 Å | 106 | R-100 |
| | | 620 Å | 110 | R-100 |
| Polyamide (6,6-nylon) | Vacuum deposition | 45 Å | 80 | R-100 |
| | | 2350 Å | 82 | R-100 |
| | DC Magnetron | 100 Å | 80 | R-100 |
| | | 4300 Å | 80 | R-100 |
| | Ion plating | 90 Å | 79 | R-100 |
| | | 620 Å | 78 | R-100 |
| Polyether (Noryl) | Vacuum deposition | 45 Å | 121 | R-100 |
| | | 2350 Å | 123 | R-100 |
| | DC Magnetron | 100 Å | 120 | R-100 |
| | | 4300 Å | 119 | R-100 |
| | Ion plating | 90 Å | 117 | R-100 |
| | | 620 Å | 118 | R-100 |
| Polysulfone (PES) | Vacuum deposition | 45 Å | 70 | R-100 |
| | | 2350 Å | 71 | R-100 |
| | DC Magnetron | 100 Å | 72 | R-100 |
| | | 4300 Å | 72 | R-100 |
| | Ion plating | 90 Å | 68 | R-100 |
| | | 620 Å | 70 | R-100 |
| Polycarbonate | Vacuum deposition | 45 Å | 82 | R-100 |
| | | 2350 Å | 82 | R-100 |

TABLE 3-continued

| Substrate material | Rubber composition I substrate composite | | | |
|---|---|---|---|---|
| | Thin film forming process | Co thin film thickness | Bond strength (kg/inch) | Adherence performance |
| | DC | 100 Å | 80 | R-100 |
| | Magnetron | 4300 Å | 80 | R-100 |
| | Ion | 90 Å | 83 | R-100 |
| | plating | 620 Å | 82 | R-100 |

As seen from the data of Table 3, even when the metal substrate material is changed from the metal of Example 1 to plastics materials, there are produced from a variety of plastics substrates composite materials having excellent adherence independent of the thickness of the cobalt thin film insofar as the rubbery composite material making method of the invention is employed. It is also demonstrated that composite materials having excellent adherence are obtained without an organic cobalt salt being blended in the rubber composition.

EXAMPLE 3

The procedure of Example 1 was repeated except that the rubber composition I was replaced by rubber compositions II-V as reported in Table 4. The resulting rubbery composite materials were evaluated for adherence.

The results of the adherence test are shown in Table 5 along with the thickness of the cobalt thin films formed during the preparation of composite material.

TABLE 4

| | Rubber Compositions II-V | | | |
|---|---|---|---|---|
| | Parts by weight | | | |
| Ingredients | II | III | IV | V |
| Natural rubber | 40 | 40 | 40 | 60 |
| Styrene-butadiene | 60 | 60 | 60 | 20 |

TABLE 4-continued

| | Rubber Compositions II-V | | | |
|---|---|---|---|---|
| | Parts by weight | | | |
| Ingredients | II | III | IV | V |
| copolymer | | | | |
| Polyisoprene | — | — | — | 20 |
| Carbon black | 20 | 50 | 80 | 50 |
| Zinc oxide | 5 | 5 | 5 | 5 |
| Anti-oxidant[1] | 2 | 2 | 2 | 2 |
| Vulcanization promotor[2] | 1 | 1 | 1 | 1 |
| Sulfur | 3 | 3 | 3 | 2 |
| Vegetable or mineral oil | 30 | 30 | 30 | 30 |

[1]Anti-oxidant: N—phenyl-N'—isopropyl-p-phenylenediamine (Ohuchi Shinko Co., Ltd., Japan)
[2]Vulcanization promotor: N—oxydiethylene-2-benzothiazole sulfamide (Ohuchi Shinko Co., Ltd., Japan)

TABLE 5

| | Rubber Compositions II-V/Metal Substrate Composite Material | | | | | | | | |
|---|---|---|---|---|---|---|---|---|---|
| | Cobalt thin film | | Rubber II composite | | Rubber III composite | | Rubber IV composite | | Rubber V composite |
| Substrate material | process | thickness (Å) | B.S. | Adh. | B.S. | Adh. | B.S. | Adh. | B.S. | Adh. |
| [Examples] | | | | | | | | | | |
| Carbon steel (SS-41) | Vacuum deposition | 820 | 106 | R100 | 85 | R100 | 48 | R100 | 118 | R100 |
| | Sputtering | 760 | 105 | R100 | 84 | R100 | 50 | R100 | 117 | R100 |
| | Ion plating | 800 | 108 | R100 | 82 | R100 | 51 | R100 | 120 | R100 |
| Aluminum | Vacuum deposition | 820 | 110 | R100 | 82 | R100 | 49 | R100 | 118 | R100 |
| | Sputtering | 760 | 106 | R100 | 83 | R100 | 50 | R100 | 110 | R100 |
| | Ion plating | 800 | 106 | R100 | 86 | R100 | 50 | R100 | 115 | R100 |
| Brass | Vacuum deposition | 820 | 104 | R100 | 86 | R100 | 52 | R100 | 113 | R100 |
| | Sputtering | 760 | 106 | R100 | 88 | R100 | 48 | R100 | 116 | R100 |
| | Ion plating | 800 | 106 | R100 | 83 | R100 | 49 | R100 | 112 | R100 |
| [Controls] | | | | | | | | | | |
| Steel | — | — | 0 | M/R100 | 0 | M/R100 | 0 | M/R100 | 0 | M/R100 |
| Aluminum | — | — | 0 | M/R100 | 0 | M/R100 | 0 | M/R100 | 0 | M/R100 |
| Brass | — | — | 0 | M/R100 | 0 | M/R100 | 0 | M/R100 | 0 | M/R100 |

The data of Table 5 indicates that the rubbery composite materials produced by the present method exhibit excellent adherence when combined with organic cobalt salt-free rubber compositions. It was found that composite materials having excellent adherence are obtained independent of the type of rubber composition as exemplified by the varying carbon content of rubber composition among compositions II-IV or the different species of base rubber between compositions II-IV and composition V. It was also found that the rubbery composite materials exhibit excellent adherence to any of the steel, aluminum, and brass substrates as in Example 1.

EXAMPLE 4

The procedure of Example 3 was repeated except that the metal substrate was replaced by plastics substrates as used in Example 2. The resulting rubbery composite materials were evaluated for adherence.

The results of the adherence test are shown in Table 6 along with the thickness of the cobalt thin films formed during the preparation of composite material.

TABLE 6

Rubber Compositions II–V/Plastic Substrate Composite Material

| Substrate material | Cobalt thin film process | thickness (Å) | Rubber II composite B.S. | Rubber II composite Adh. | Rubber III composite B.S. | Rubber III composite Adh. | Rubber IV composite B.S. | Rubber IV composite Adh. | Rubber V composite B.S. | Rubber V composite Adh. |
|---|---|---|---|---|---|---|---|---|---|---|
| Polyallylate (U-polymer) | Vacuum deposition | 820 | 140 | R100 | 120 | R100 | 89 | R100 | 150 | R100 |
|  | DC Magnetron | 760 | 138 | R100 | 116 | R100 | 90 | R100 | 148 | R100 |
|  | Ion plating | 800 | 142 | R100 | 118 | R100 | 92 | R100 | 144 | R100 |
| Polyamide (6,6-nylon) | Vacuum deposition | 820 | 120 | R100 | 96 | R100 | 60 | R100 | 130 | R100 |
|  | DC Magnetron | 760 | 120 | R100 | 92 | R100 | 61 | R100 | 132 | R100 |
|  | Ion plating | 800 | 118 | R100 | 90 | R100 | 59 | R100 | 133 | R100 |
| Polyether (Noryl) | Vacuum deposition | 820 | 150 | R100 | 130 | R100 | 100 | R100 | 160 | R100 |
|  | DC Magnetron | 760 | 149 | R100 | 130 | R100 | 101 | R100 | 158 | R100 |
|  | Ion plating | 800 | 152 | R100 | 132 | R100 | 103 | R100 | 163 | R100 |
| Polysulfone (PES) | Vacuum deposition | 820 | 118 | R100 | 90 | R100 | 62 | R100 | 125 | R100 |
|  | DC Magnetron | 760 | 116 | R100 | 90 | R100 | 60 | R100 | 127 | R100 |
|  | Ion plating | 800 | 115 | R100 | 88 | R100 | 58 | R100 | 124 | R100 |
| Polycarbonate | Vacuum deposition | 820 | 118 | R100 | 98 | R100 | 60 | R100 | 128 | R100 |
|  | DC Magnetron | 760 | 120 | R100 | 96 | R100 | 60 | R100 | 130 | R100 |
|  | Ion plating | 800 | 125 | R100 | 95 | R100 | 58 | R100 | 135 | R100 |

The data of Table 6 indicates that even when the substrate material is changed from the metals of Example 3 to many plastics materials, the method of the present invention allows for the production of rubbery composite materials having excellent adherence to any of the plastics materials independent of the type of rubber composition. Good adherence achieved with the rubber compositions which are free of an organic cobalt salt also demonstrates the effectiveness of the present invention.

EXAMPLE 5

A rubbery composite material which was prepared by forming a cobalt thin film of 40 angstrom thick on a brass piece as used in Example 1 by vacuum deposition and then vulcanizing rubber composition I in Table 1, at 145° C. under pressure for 40 minutes was evaluated for adherence by the same procedure as in Example 1 both as prepared and after heating at 100° C. for 24 hours. The heat aging was determined in terms of the adherence of the original and heat-aged composite materials and the appearance of the original and heat-aged rubber compositions at the end of the adherence test.

For comparison, a cobalt naphthenate-containing rubber composition having the same formulation as composition I except that 2 parts by weight of vegetable or mineral oil was replaced by 2 parts by weight of cobalt naphthenate was vulcanized directly onto a brass piece as used in Example 1 by heating the composition under pressure as described above. This composite material was also evaluated for heat aging.

The results of heat aging test are shown in Table 7.

TABLE 7

| Rubbery composite material | | | Heat aging Initial | | Heat aging After 24-hour heating @ 100° C. | |
|---|---|---|---|---|---|---|
| Substrate material | Co thin film | Rubber composition | Bond strength (kg/inch) | Appearance of rubber | Bond strength (kg/inch) | Appearance of rubber |
| Brass | 40 Å | Co naphthenate-free composition I | 40 | complete rubber breakage | 40 | complete rubber breakage |
| Brass | — | Co naphthenate-containing composition I | 36 | complete rubber breakage | 25 | rubber deteriorate |

The data of Table 7 indicates that both the rubbery composite materials prepared by the present method using a cobalt naphthenate-containing rubber composition and a cobalt naphthenate-free rubber composition exhibit excellent adherence at the initial. Although the composite material associated with the cobalt naphthenate-containing rubber composition experiences a substantial performance drop as a result of heat aging, the composite material associated with the cobalt naphthenate-free rubber composition experiences little change of performance after the heat aging and thus has excellent heat-aging resistance.

It is thus evident that the present invention has eliminated the problem associated with the use of an organic cobalt salt by depositing a cobalt thin film on the surface of a substrate and bonding an organic cobalt salt-free rubber composition to the metallized substrate under heat and pressure through vulcanization.

EXAMPLE 6

A brass (Cu 63%/Zn 37%)-plated steel code (strand construction 3 +6, outer diameter 1.2 mm) was cleaned and cobalt thin film having a thickness of 400 Å deposited on the surface of the cord by the sputtering process (B) according to the same procedure as Example 1.

The thus obtained cord having a cobalt thin film thereon, was cut to a length of 20 cm. The 20 cm cord was embedded in a rubber composition having the formulation shown in Table 8, followed by pressing the rubber composition at 145° C. for 40 minutes to vulcanize the composition and bond the cord to the composition, thereby obtaining a rubbery composite sample according to the invention.

Further, the brass-plated steel cord without any cobalt thin film was bonded directly with the rubber composition in the same procedure as above to obtain a rubbery composite sample for comparison.

Next, the bond strength between the cord and the rubber and the rubber coverage were evaluated by peeling the cord from the rubber at a rate of 50 mm/min using a tensile strength tester. The results are shown in Table 9.

Further, after the rubbery composite materials were heat treated at 100° C. for 24 hours, the change of bond strength before and after heat treatment was evaluated. The results are shown in Table 10.

The properties of the rubber before and after heat treating at 100° C for 24 hours were also evaluated. The results are shown in Table 11.

TABLE 8

| | Rubber Composition VI to XIV | | | | | | | | |
|---|---|---|---|---|---|---|---|---|---|
| | Parts by Weight | | | | | | | | |
| | VI | VII | VIII | IX | X | XI | XII | XIII | XIV |
| Natural Rubber | 100 | 100 | 100 | 100 | 100 | 100 | 100 | 100 | 100 |
| Carbon black | 60 | 60 | 60 | 60 | 60 | 60 | 60 | 60 | 60 |
| Zinc oxide | 6 | 6 | 6 | 6 | 6 | 6 | 6 | 6 | 6 |
| Anti-oxidant[1] | 2 | 2 | 2 | 2 | 2 | 2 | 2 | 2 | 2 |
| Vulcanization promoter[2] | 1 | 1 | 1 | 1 | 1 | 1 | 1 | 1 | 1 |
| Sulfur | 1 | 2 | 3 | 4 | 5 | 6 | 2 | 4 | 6 |
| Vegetable or mineral oil | 2 | 2 | 2 | 2 | 2 | 2 | — | — | — |
| Cobalt naphthenate | — | — | — | — | — | — | 2 | 2 | 2 |

[1]Anti-oxidant: N—phenyl-N'—isopropyl-p-phenylenediamine (Ohuchi Shinko Co., Ltd., Japan)
[2]Vulcanization promoter: N—oxydiethylene-2-benzothiazole sulfamide (Ohuchi Shinko Co., Ltd., Japan)

TABLE 9

| Co thin film thickness (Å) | Rubber composition | Cobalt naphthenate blending amount (parts by weight) | Sulfur blending amount (parts by weight) | Bond strength (kg/code) | Adherence performance |
|---|---|---|---|---|---|
| 400 | VII | none | 2 | 16.1 | R-100 |
| 400 | IX | none | 4 | 13.7 | " |
| 400 | XI | none | 6 | 12.8 | " |
| 400 | XII | 2 | 2 | 14.0 | " |
| 400 | XIII | 2 | 4 | 12.5 | " |
| 400 | XIV | 2 | 6 | 9.5 | " |
| none | VII | none | 2 | 6.4 | R-40,M/R60 |
| none | IX | none | 4 | 5.6 | R-60,M/R40 |
| none | XI | none | 6 | 10.3 | R-90,M/R10 |
| none | XII | 2 | 2 | 7.9 | R-20,M/R80 |
| none | XIII | 2 | 4 | 13.0 | R-100 |
| none | XIV | 2 | 6 | 11.7 | " |

TABLE 10

| Rubber composition | Cobalt naphthenate blending amount (parts by weight) | Sulfur blending amount (parts by weight) | Bond strength (kg/code) Heating (100° C., 24 hr) Before | After | Retension (%) | Adherence performance Heating (100° C., 24 hr) Before | After |
|---|---|---|---|---|---|---|---|
| VI | none | 1 | 19.0 | 13.5 | 71 | R-100 | R-100 |
| VII | " | 2 | 15.0 | 10.0 | 67 | " | " |
| VIII | " | 3 | 14.0 | 4.8 | 34 | " | " |
| IX | " | 4 | 12.5 | 4.3 | 34 | " | " |
| X | " | 5 | 12.0 | 3.9 | 33 | " | " |
| XI | " | 6 | 12.0 | 3.8 | 32 | " | " |

TABLE 11

| Rubber Composition | Cobalt naphthenate blending amount (parts by weight) | Sulfur blending amount (parts by weight) | Modulus of elasticity (kg/cm$^2$) Heating (100° C., 24 hr) Before | Modulus of elasticity (kg/cm$^2$) Heating (100° C., 24 hr) After | Retention (%) | Breaking strength (kg/cm$^2$) Heating (100° C., 24 hr) Before | Breaking strength (kg/cm$^2$) Heating (100° C., 24 hr) After | Retention (%) | Breaking extension (%) Heating (100° C., 24 hr) Before | Breaking extension (%) Heating (100° C., 24 hr) After | Retention (%) |
|---|---|---|---|---|---|---|---|---|---|---|---|
| VII | none | 2 | 30 | 39 | 130 | 247 | 170 | 70 | 475 | 350 | 74 |
| IX | none | 4 | 46 | 62 | 135 | 227 | 107 | 47 | 388 | 150 | 39 |
| XI | none | 6 | 51 | 67 | 131 | 205 | 72 | 35 | 353 | 98 | 28 |
| XII | 2 | 2 | 30 | 37 | 123 | 215 | 76 | 35 | 480 | 205 | 43 |
| XIII | 2 | 4 | 45 | 57 | 127 | 222 | 65 | 29 | 427 | 125 | 29 |
| XIV | 2 | 6 | 54 | 75 | 139 | 214 | 55 | 26 | 380 | 83 | 22 |

As seen from the results of Tables 9 to 11, the rubbery composite material obtained by bonding a rubber composition containing 4 parts by weight or less, particularly 2 parts by weight or less of sulfur and no organic cobalt salt and a substrate having a cobalt thin layer thereon has an excellent adhesion property and an excellent physical property even after heat treatment.

EXAMPLE 7

The substrates used were pieces of 25 mm wide by 60 mm long by 2 mm thick which were cut from polyallylate (trade name U-Polymer, Unichika Co., Ltd.), polyamide (6,6-nylon), polyether (trade name Noryl, Engineering Plastics Co., Ltd.), polysulfone (trade name PES, Nissan Chemical Co., Ltd.), and polycarbonate, and degreased on the surface with suitable solvent. Thereafter, the dry platings (A) to (C) were conducted.

The rubbery composite materials obtained after vulcanization bonding of the rubber composition to the substrate were evaluated for adherence by a 90° peeling test using a tensile tester at a pulling speed of 50 mm/min.

The results of the adherence evaluation test are shown in Table 12 (Vacuum deposition), Table 13 (DC magnetron sputtering) and Table 14 (Ion plating).

TABLE 12

| Substrate material | Metal thin film | Metal thin film thickness | Rubber composition I-substrate composite Bond strength (kg/inch) | Adherence performance* |
|---|---|---|---|---|
| Poly-allylate (U-Polymer) | Cu | 420 Å | 83 | R-100 |
|  | Co | 560 Å | 87 | R-100 |
| Polyamide (6,6-nylon) | Zn | 620 Å | 60 | R-100 |
|  |  | 620 Å | 60 | R-100 |
|  |  | 13000 Å | 63 | R-100 |
|  | Cu | 420 Å | 62 | R-100 |
|  | Co | 560 Å | 58 | R-100 |
| Polyether (Noryl) | Zn | 120 Å | 100 | R-100 |
|  |  | 620 Å | 104 | R-100 |
|  |  | 13000 Å | 99 | R-100 |
|  | Cu | 420 Å | 100 | R-100 |
|  | Co | 560 Å | 102 | R-100 |
| Polysulfone (PES) | Cu | 420 Å | 62 | R-100 |
|  | Co | 560 Å | 63 | R-100 |
| Poly-carbonate | Cu | 420 Å | 58 | R-100 |
|  | Co | 560 Å | 58 | R-100 |

*R designates rubber breakage and figures represent percentages of breakage. R-100 represents that 100% of breakage is cohesive breakage of the rubber portion.

TABLE 13

DC magnetron sputtering

| Substrate material | Metal thin film | Metal thin film thickness | Rubber composition I-substrate composite Bond strength (kg/inch) | Adherence performance |
|---|---|---|---|---|
| Poly-allylate (U-Polymer) | Zn | 118 Å | 92 | R-100 |
|  |  | 750 Å | 84 | R-100 |
|  |  | 12500 Å | 90 | R 100 |
|  | Cu | 350 Å | 82 | R-100 |
|  | Co | 530 Å | 85 | R 100 |
| Polyamide (6,6-nylon) | Zn | 118 Å | 62 | R-100 |
|  |  | 750 Å | 60 | R-100 |
|  |  | 12500 Å | 60 | R-100 |
|  | Cu | 350 Å | 60 | R-100 |
|  | Co | 530 Å | 60 | R-100 |
| Polyether (Noryl) | Zn | 118 Å | 102 | R-100 |
|  |  | 750 Å | 98 | R-100 |
|  |  | 12500 Å | 110 | R-100 |
|  | Cu | 350 Å | 90 | R-100 |
|  | Co | 530 Å | 98 | R-100 |
| Polysulfone (PES) | Zn | 750 Å | 57 | R-100 |
|  | Cu | 350 Å | 58 | R-100 |
|  | Co | 530 Å | 60 | R-100 |
| Poly-carbonate | Zn | 750 Å | 57 | R-100 |
|  | Cu | 350 Å | 60 | R-100 |
|  | Co | 530 Å | 62 | R-100 |

TABLE 14

Ion plating

| Substrate material | Metal thin film | Metal thin film thickness | Rubber composition I-substrate composite Bond strength (kg/inch) | Adherence performance |
|---|---|---|---|---|
| Poly-allylate (U-Polymer) | Zn | 105 Å | 98 | R-100 |
|  |  | 500 Å | 92 | R-100 |
|  |  | 11200 Å | 95 | R-100 |
|  | Cu | 400 Å | 90 | R-100 |
|  | Co | 480 Å | 90 | R-100 |
| Polyamide (6,6-nylon) | Zn | 105 Å | 65 | R-100 |
|  |  | 500 Å | 62 | R-100 |
|  |  | 11200 Å | 70 | R-100 |
|  | Cu | 400 Å | 63 | R-100 |
|  | Co | 480 Å | 63 | R-100 |
| Polyether (Noryl) | Zn | 105 Å | 99 | R-100 |
|  |  | 500 Å | 102 | R-100 |
|  |  | 11200 Å | 100 | R-100 |
|  | Cu | 400 Å | 97 | R-100 |
|  | Co | 480 Å | 105 | R-100 |
| Polysulfone (PES) | Zn | 500 Å | 57 | R-100 |
|  | Cu | 400 Å | 60 | R-100 |
|  | Co | 480 Å | 60 | R-100 |
| Poly-carbonate | Zn | 500 Å | 62 | R-100 |
|  | Cu | 400 Å | 61 | R-100 |

TABLE 14-continued

| | Ion plating | | | |
| | | | Rubber composition I-substrate composite | |
| Substrate material | Metal thin film | Metal thin film thickness | Bond strength (kg/inch) | Adherence performance |
| --- | --- | --- | --- | --- |
| | Co | 480 Å | 59 | R-100 |

What is claimed is:

1. A method for preparing a rubbery composite material comprising a metal substrate and a rubber composition bonded thereto, comprising the steps of:

depositing a cobalt or cobalt alloy thin film having a thickness of from about 10 Å to 100 μm on the surface of a metal substrate by a dry plating process selected from the group consisting of ion plating, DC and RF magnetron sputtering, bipolar sputtering and RF sputtering processes, said cobalt alloy having more than 80% by weight of cobalt and holding a rubber composition in intimate contact with said cobalt or cobalt alloy thin film under heat and pressure to achieve vulcanization bonding, said rubber composition being free of an organic cobalt salt.

2. The method according to claim 1, wherein the rubber composition contains sulfur as a vulcanization agent in an amount of 0.5 to 4 by weight to 100 parts by weight of a rubber component in the rubber composition.

3. The method according to claim 2, wherein the rubber composition contains sulfur in an amount of 0.5 to 3 parts by weight to 100 parts by weight of the rubber component.

4. The method according to claim 1, wherein the cobalt alloy is C—Ni, Co—P, Co—Cr, Co—Al, Co—Sn or Co—Zn.

5. A method for preparing a rubbery composite material comprising a metal substrate and a rubber composition bonded thereto, comprising the steps of:

depositing a cobalt or cobalt alloy thin film having a thickness of from about 10Å to 100 μm on the surface of a metal substrate by a dry plating process, in which said process is a vacuum deposition process, said cobalt alloy having more than 80% by weight of cobalt and holding a rubber composition in intimate contact with said cobalt or cobalt alloy thin film under heat and pressure to achieve vulcanization bonding, said rubber composition being free of an organic cobalt salt.

6. The method according to claim 5, wherein the rubber composition contains sulfur as a vulcanization agent in an amount of 0.5 to 4 by weight to 100 parts by weight of a rubber component in the rubber composition.

7. The method according to claim 6, wherein the rubber composition contains sulfur in an amount of 0.5 to 3 parts by weight to 100 parts by weight of the rubber component.

8. The method according to claim 5, wherein the cobalt alloy is Co—Ni, Co—P, Co—Cr, Co—Al, Co—Sn or Co—Zn.

* * * * *